United States Patent
Kaushik

(10) Patent No.: US 9,800,611 B2
(45) Date of Patent: *Oct. 24, 2017

(54) DETECTION OF SPOOF ATTACKS ON INTERNET OF THINGS (IOT) LOCATION BROADCASTING BEACONS

(71) Applicant: Fortinet, Inc., Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/286,532

(22) Filed: Oct. 5, 2016

(65) Prior Publication Data

US 2017/0026408 A1 Jan. 26, 2017

Related U.S. Application Data

(63) Continuation of application No. 14/515,508, filed on Oct. 15, 2014, now Pat. No. 9,467,863.

(51) Int. Cl.
*H04W 12/12* (2009.01)
*H04L 29/06* (2006.01)
*H04W 84/12* (2009.01)

(52) U.S. Cl.
CPC ...... *H04L 63/1466* (2013.01); *H04L 63/1416* (2013.01); *H04W 12/12* (2013.01); *H04W 84/12* (2013.01)

(58) Field of Classification Search
None
See application file for complete search history.

(56) References Cited

U.S. PATENT DOCUMENTS

| | | |
|---|---|---|
| 7,885,639 B1 | 2/2011 | Satish |
| 2007/0298720 A1 | 12/2007 | Wolman et al. |
| 2008/0250498 A1 | 10/2008 | Butti et al. |
| 2011/0131651 A1 | 6/2011 | Shanmugavadivel et al. |

*Primary Examiner* — Daniel Lai
(74) *Attorney, Agent, or Firm* — Law Office of Dorian Cartwright; Dorian Cartwright

(57) ABSTRACT

Spoof attacks on location based beacons are detected. A stream of beacons (e.g., IBEACONS) comprising at least a unique source identifier is generated. The stream of beacons is broadcast over a wireless communication channel to mobile devices within range. A list of broadcasted beacons is stored in a table along with a time and location of broadcast. Subsequent to broadcasting, a stream of beacons is detected. The detected beacon stream comprises a unique source identifier along with a time and a location of broadcast. The unique source identifier, the time and the location of at least one beacon of the detected beacon stream can be compared to the unique source identifier, the time and the location of at least one beacon of the broadcast beacon stream. Responsive to a match between the unique source identifiers and a mismatch of at least one of the time and locations, it is determined that the broadcast beacon stream has been spoofed by the detected beacon stream. Once a spoof has been detected, various remediation actions can be taken, such as sending alerts to admin, cautioning end users, and other security mode procedures.

12 Claims, 4 Drawing Sheets

300

| UUID | Time | Location | Count |
|---|---|---|---|
| 1 | <timestamp of the transmission> | Campus/building/floor/(x,y) | # times dummy iBeacon is transmitted |

DETECTION OF SPOOF ATTACKS ON INTERNET OF THINGS (IOT) LOCATION BROADCASTING BEACONS

RELATED APPLICATION DATA

This application claims the benefit as a continuation of U.S. application Ser. No. 14/515,508, entitled Detection of Spoof Attacks on Location Broadcasting Beacons and filed on Oct. 15, 2014, the contents of which is hereby incorporated in its entirety.

FIELD OF THE INVENTION

The invention relates generally to wireless computer networking, and more specifically, detecting spoof attacks on location broadcasting beacons.

BACKGROUND

The introduction of low cost location broadcasting beacon devices further opens the door for the IoT (Internet of Things). One of these devices attached to everyday physical objects bridges the vast amount of Internet information about the objects to end users with smart phones or other device receiving the beacons. The objects can also become the subject of e-commerce by automatically configuring a purchase for a nearby end user. Furthermore, the devices broadcast a location that is useful for tracking a moving object and for non-GPS location services.

The openness of these systems, many of which are unencrypted and do not require authentication credentials, is also a major vulnerability. These systems are relatively easy to spoof and can confuse a user as to which information is legitimate, especially during an e-commerce transaction involving sensitive personal data.

What is needed is a robust technique to enhance the security of location broadcasting beacons by detecting and warning of spoof attacks.

SUMMARY

These shortcomings are addressed by the present disclosure of methods, computer program products, and systems for detecting spoof attacks on location broadcasting beacons.

In one embodiment, a stream of dummy beacons (e.g., dummy IBEACONS) comprising at least a unique source identifier is generated. The stream of beacons is broadcast over a wireless communication channel to mobile devices within range. A list of broadcasted beacons is stored in a table along with a time and location of broadcast.

In an embodiment, subsequent to broadcasting, a stream of beacons is detected. The detected beacon stream comprises a unique source identifier along with a time and a location of broadcast. The unique source identifier, the time and the location of at least one beacon of the detected beacon stream can be compared to the unique source identifier, the time and the location of at least one beacon of the broadcast beacon stream. Responsive to a match between the unique source identifiers and a mismatch of at least one of the time and locations, it is determined that the broadcast beacon stream has been spoofed by the detected beacon stream.

Once a spoof has been detected, various remediation actions can be taken, such as sending alerts to admin, cautioning end users, and other security mode procedures. Advantageously, security is enhanced for location broadcasting services.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for detecting spoof attacks on location broadcasting beacons. One of ordinary skill in the art will recognize that many other scenarios are possible, as discussed in more detail below.

Figure 1:
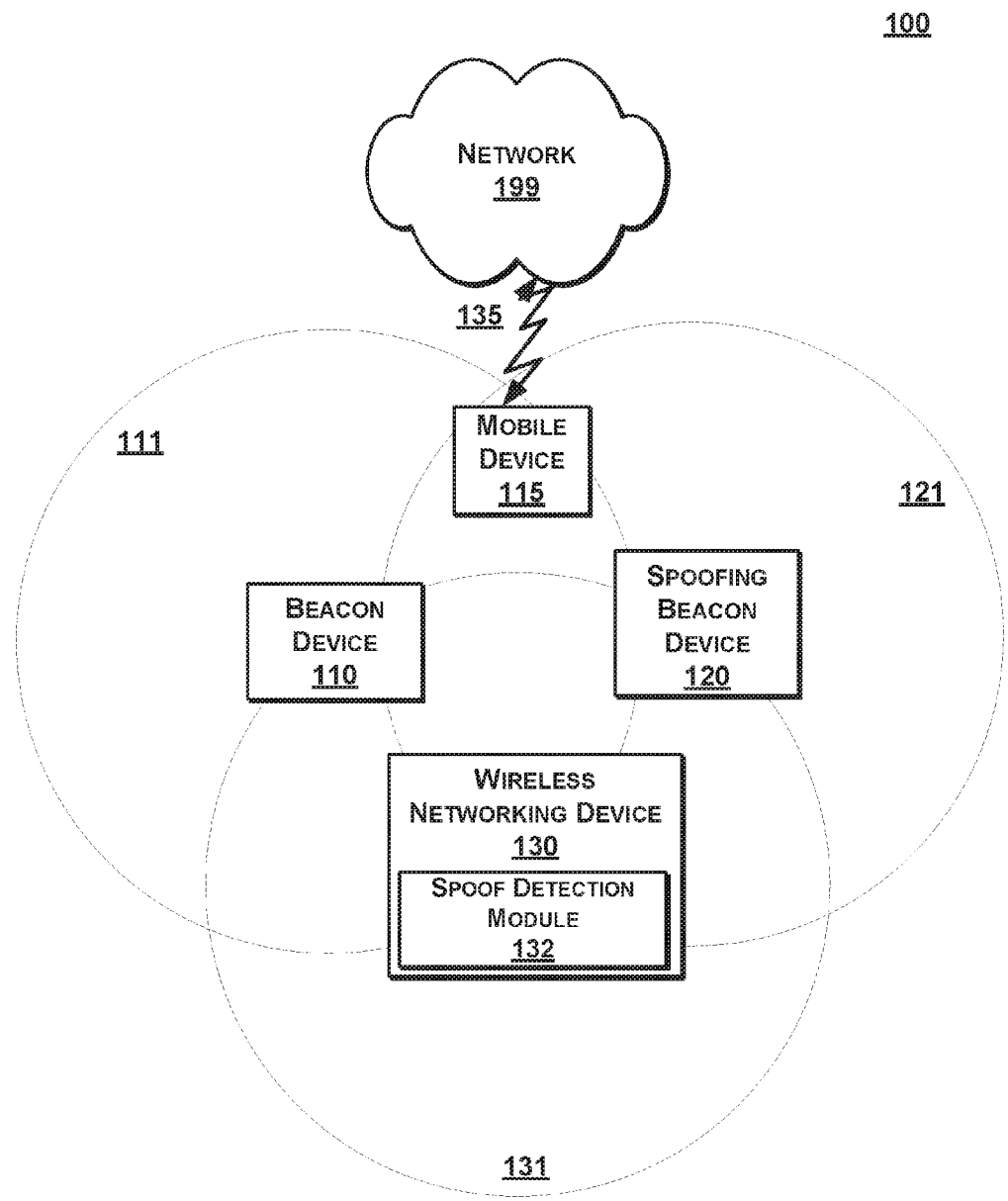
FIG. 1 is a high-level block diagram illustrating a system to detect spoof attacks of location broadcasting beacons, according to one embodiment.
Figures 2, 3:
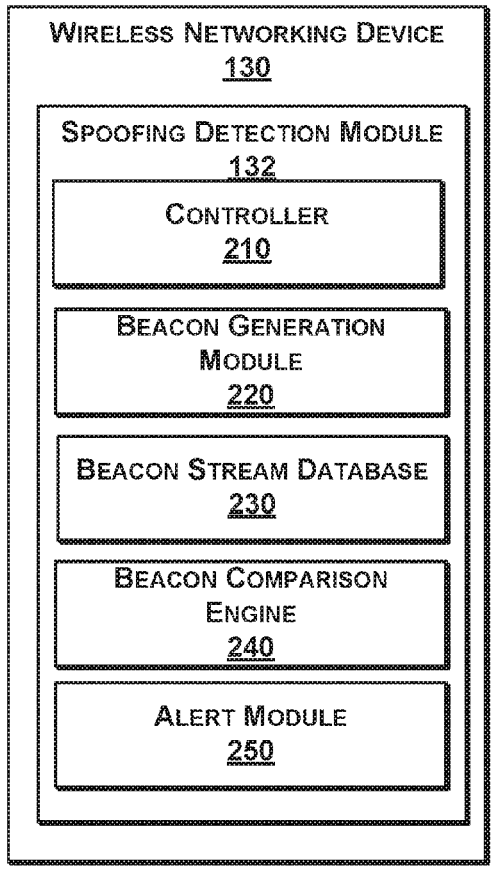
FIG. 2 is a more detailed block diagram illustrating a wireless networking device of the system of FIG. 1, according to one embodiment.
FIG. 3 is a sample table to track a broadcast stream of beacons for comparison to detected streams of beacons, according to one embodiment.

Systems to Detect Spoof Attacks on Location Broadcasting Beacons (FIG. 1-3)

FIG. 1 is a high-level block diagram illustrating a system 100 to detect spoof attacks of location broadcasting beacons. The system 100 comprises a beacon device 110, mobile device 115, a spoofing beacon device 120, and wireless networking device 130. The beacon device 110 has an RF (Radio Frequency) range 111, spoofing beacon device 120 has an RF range 121, and wireless networking device 130 has an RF range 131. Mobile device 115 can be wirelessly coupled 135 to a network 199 (e.g., data or cellular network, Internet, LAN, etc.). Other embodiments of communication channels for system 100 are possible with additional components.

The beacon device 110 broadcasts a stream of individual location beacons using a wireless medium, such as BLUETOOTH, BLUETOOTH Low Energy (BTLE), Wi-Fi, or the like. The mobile device 115 is within RF range 111, and thus, is able to receive the location beacons and take advantage of related services. In one embodiment, the beacons comprise IBEACONS defined by APPLE Computer of Cupertino, Calif. Other types of beacons can be used including IEEE 802.11 and other wireless protocol beacons. Beacons can include a unique identifier, along with a location, a time of transmission, and a packet sequence number. The unique identifier can be locally unique or globally unique and refer to a beacon device in and of itself, or to a host to which a beacon device is attached to or associated with.

The beacon device 110 can be implemented with a processor, a memory element and a transmitter in an enclosure. The enclosure can be attachable to a host using double sided tape, screws, Velcro, or the like. For example, a beacon device can have a small form factor and subtly attached to the rear panel of a television on display at an electronics store. In some implementations, the beacon device 110 is attached to a moving object, such as a train, causing the location to change over time.

The mobile device 115 is proximate to the beacon devices A,B can detect a stream of location beacons and scan for a unique identifier. In turn, the identifier is used to query a database or for an Internet search through network 199 to get further information. Returning to the example, a corner display of a television in an electronics store can automatically present specifications or a temporary coupon, retrieved from a database record. In some cases, there is no additional information other than a location itself. The mobile device 115 can comprise a smartphone, a table device, a phablet device, a laptop computer, an automobile or any mobile computing device capable of receiving beacons (e.g., see FIG. 5). In one embodiment, mobile application or daemon is downloaded and installed on the mobile device 115. In another embodiment, beacon scanning and processing is integrated within an operating system of the mobile device 115 (e.g., iPhones executing iOS7 by APPLE Computers of Cupertino, Calif.).

The spoofing beacon device 120 listens for beacons and transmits copies. Some location broadcasting services are unencrypted and particularly straightforward to spoof. The mobile device 115 is also within RF range 115 of the spoofing beacon device 120 which may operate for devious purposes. For example, the mobile device 115 can be sent to a web site showing derogatory information about a host associated with the beacon device 110. Further, financial information can be compromised if a user of the mobile device 115 assumes the spoofing beacon device information to be legitimate.

The spoofing beacon device 120 can be implemented with a processor, a memory element, a receiver to listen for nearby location broadcasts, and additionally, a receiver to send out spoofed beacons.

The wireless networking device 130 detects the spoofed beacons by inserting dummy beacon streams into broadcasts. Broadcast beacons are referred to dummy beacons when there is no underlying purpose for streaming other than to detect spoofing. The broadcasted beacons are recorded in a table including a time, location, and packet sequence number. Table 300 of FIG. 3 is one sample of recordations. When spoofing is in process, the wireless networking device 130 will detect the copied and retransmitted beacons sent out by the spoofing beacon device 120. As shown in FIG. 1, the spoofing beacon device 120 is within RF range 131 of the wireless networking device 130 in order to receive dummy beacons, and likewise, the wireless networking device 130 is within RF range 121 of spoofing beacon device 120 in order to receive spoofed beacons. A comparison of table entries having the same unique identification number and packet sequence number with a broadcast time and location matches for the broadcast stream originated by the wireless device 130. However, the spoofing beacon device 120 rebroadcasts a packet stream, and thus, packets having the same unique identifier and sequence number will differ in broadcast time and location. Consequently, a comparison to table entries will reveal spoofed frames.

In an alternative embodiment, the wireless networking device 130 detects a spoofing device by listening to, and analyzing packet streams, without inserting any packets. To do so, unique identifiers between packets are matched, and then sequence numbers that are intended to be unique to a packet stream are matched between different packets. Multiple packets having the same sequence number is indicative of a copy. To further verify, broadcast time and locations are checked.

In response to the spoofing, the wireless networking device 130 can be configured to take various actions. In one instance, network administrator can be notified via SMS or e-mail, or the incident can be logged. In another instance, the wireless networking device 130 can jam the spoofing stream. In still another instance, a warning beacon stream can be inserted in order to caution end-users of the breach.

In one embodiment, the wireless networking device 130 is integrated with the beacon device 110. In other words, spoofing is detected from a device that also serves to legitimately advertise a location. Thus, the broadcast stream is not a dummy stream and is self-cross-referenced with detected streams to detect spoofing. In some systems, a combination of the more expensive and complex hybrid devices are interspersed among lower costing and less complex stand-alone location broadcasters.

Figure 5:
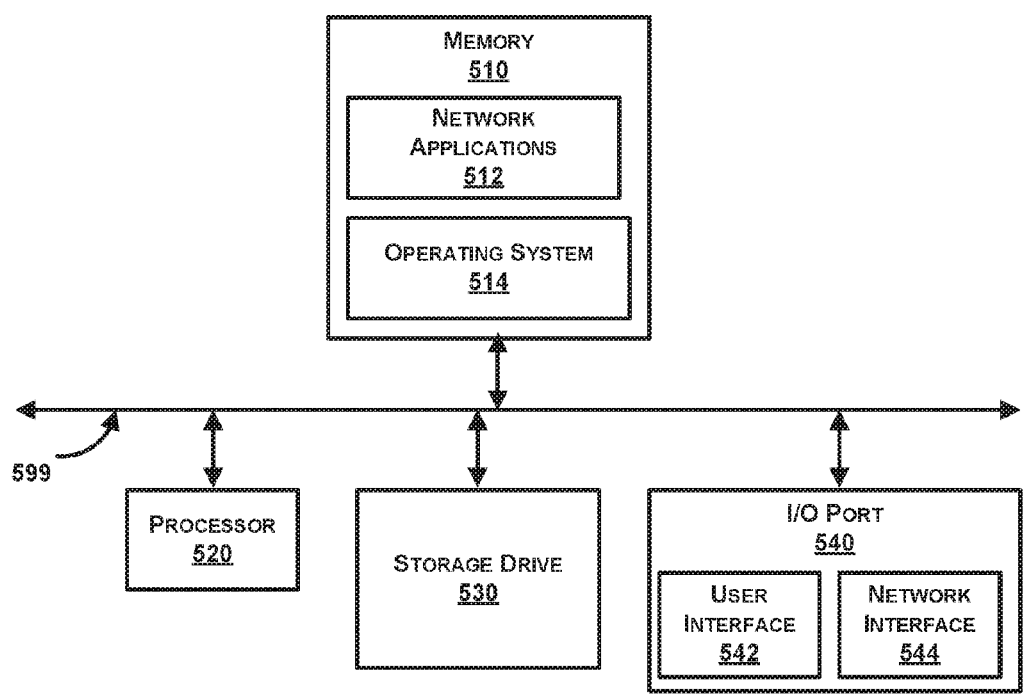
FIG. 5 is a block diagram illustrating an exemplary computing device, according to one embodiment.

The wireless networking device 130 can be implemented in an access point, a smartphone, laptop, or the like (see e.g., FIG. 5). Additional embodiments of the wireless networking device 130 are set forth below in association with FIG. 2.

FIG. 2 is a more detailed block diagram illustrating a wireless networking device 130, according to one embodiment. The wireless networking device 130 includes a controller 210, a beacon generation module 220, a beacon stream database 230, a beacon comparison engine 240, and an alert module 250. The components can be implemented in hardware, software, or a combination of both.

The controller 210 calls various modules for spoofing detection, interfaces with an operating system, sends and receives beacon streams from a transceiver (not shown), can provide a user interface, and can spawn new instances when necessary. The beacon generation module 220 composes a dummy beacon stream according to a protocol such as BLUETOOTH or IEEE 802.11. The beacon stream database 230 stores the broadcast beacon stream along with data described herein. The beacon comparison engine 240 analyzes broadcast beacons against detected beacons to identify anomalies. The alert module 250 takes actions, as configured, upon discovery of spoofed beacons.

Figure 4:
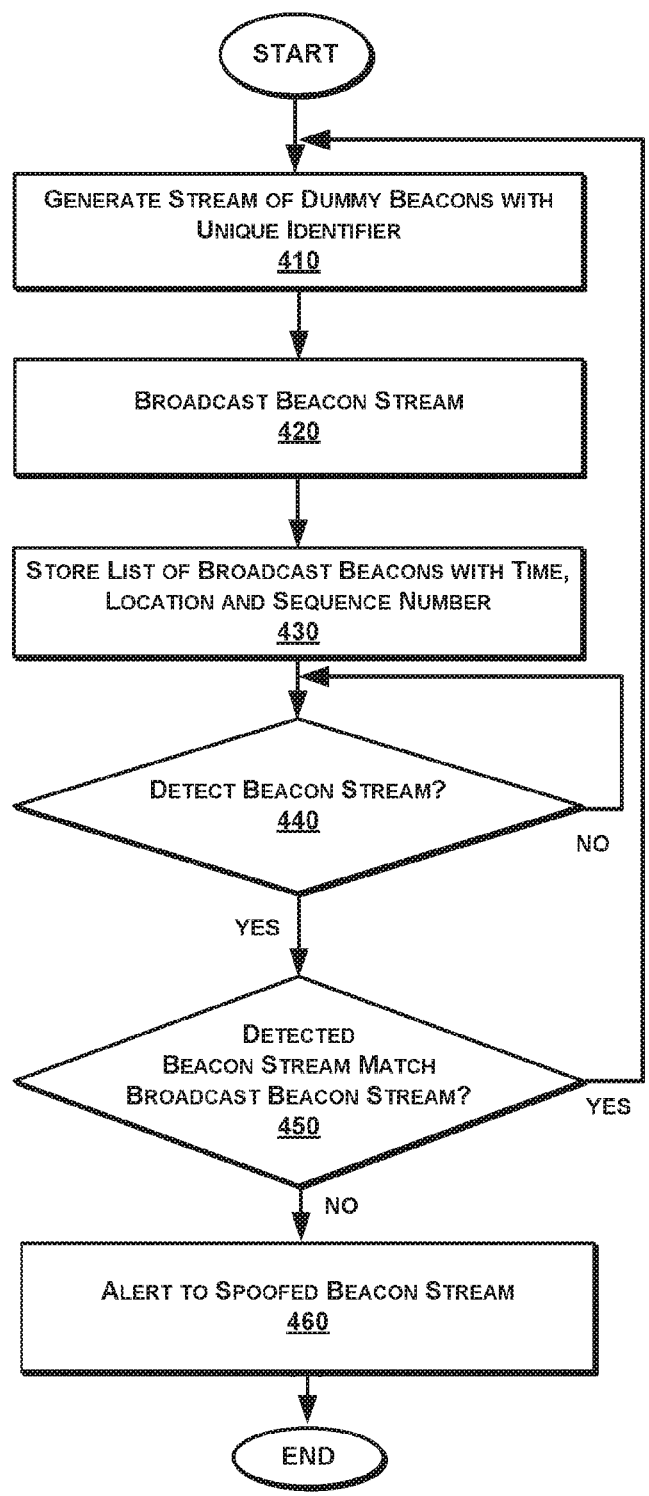
FIG. 4 is a high-level flow diagram illustrating a method for detecting spoof attacks of location broadcasting beacons, according to one embodiment.

Methods for Detecting Spoof Attacks on Location Broadcasting Beacons (FIG. 4)

FIG. 4 is a high-level flow diagram illustrating a method 400 for detecting spoof attacks of location broadcasting beacons, according to one embodiment (e.g., by the wireless networking device 130 of FIG. 1). The method 400 non-limiting, as other processes can have more or fewer steps performed in a different order.

A stream of dummy beacons comprising at least a unique source identifier is generated (step 410). The stream of beacons is broadcast over a wireless communication channel (step 420). A list of broadcasted beacons is stored along with a time and location of broadcast (step 430).

Subsequent to broadcasting, a stream of beacons is detected (step 440). The detected beacon stream comprises at least a unique source identifier along with a time and a location of broadcast. The unique source identifier, the time and the location of at least one beacon of the detected beacon stream is compared to the unique source identifier, the time and the location of at least one beacon of the broadcast beacon stream (step 450). Responsive to a match between the unique source identifiers and a mismatch of at least one of the time and locations, it may be determined that the broadcast beacon stream has been spoofed by the detected beacon stream (step 460).

Generic Computing Device (FIG. 5)

FIG. 5 is a block diagram illustrating an exemplary computing device 900 for use in the system 100 of FIG. 1, according to one embodiment. The computing device 900 is an exemplary device that is implementable for each of the components of the system 100, including the wireless networking device 130. The computing device 500 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 500, of the present embodiment, includes a memory 510, a processor 520, a storage drive 530, and an I/O port 540. Each of the components is coupled for electronic communication via a bus 555. Communication can be digital and/or analog, and use any suitable protocol.

The memory 510 further comprises network applications 512 and an operating system 514. The network applications 520 can be the instant messenger application 210 and/or the instant messenger module 220). Other network applications 512 can include a web browser, a mobile application, an application that uses networking, a remote application executing locally, a network protocol application, a network management application, a network routing application, or the like.

The operating system 514 can be one of the Microsoft Windows® family of operating systems (e.g., Windows 55, 58, Me, Windows NT, Windows 2000, Windows XP, Windows XP x64 Edition, Windows Vista, Windows CE, Windows Mobile, Windows 5 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the storage drive 530

The storage drive 530 can be any non-volatile type of storage such as a magnetic disc, EEPROM, Flash, or the like. The storage drive 530 stores code and data for applications.

The I/O port 540 further comprises a user interface 542 and a network interface 544. The user interface 542 can output to a display device and receive input from, for example, a keyboard. The network interface 544 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in a wireless networking device for detecting spoof attacks of location broadcasting beacons, the method comprising the steps of:

detecting a first stream of beacons comprising at least a first unique source identifier, and a packet sequence number with a broadcast time for each beacon, over a wireless communication channel;

storing the unique source identifier along with a sequence number and a time of broadcast for at least one of the first stream of beacons;

subsequent to detecting the first stream, detecting a second stream of beacons, the detected beacon stream comprising at least a second unique source identifier along with a packet sequence number and a broadcast time for each beacon;

comparing the first and second unique source identifiers, packet sequence numbers and broadcast times of the at least one of the first stream of beacons; and responsive to a match between the first and second unique source identifiers and packet sequence numbers, and a mismatch of at least one of the times, determining that the first broadcast beacon stream has been spoofed by the second beacon stream.

2. The method of claim 1, wherein the first and second streams of beacons comprise IBEACONS.

3. The method of claim 1, wherein the wireless communication channel comprises a BLUETOOTH communication channel.

4. The method of claim 1, wherein the wireless communication channel comprises an IEEE 802.11 communication channel.

5. A non-transitory computer readable medium storing computer source code that, when executed by a processor, performs a method in a wireless networking device for detecting spoof attacks of location broadcasting beacons, the method comprising the steps of:
  detecting a first stream of beacons comprising at least a first unique source identifier, and a packet sequence number with a broadcast time for each beacon, over a wireless communication channel;
  storing the unique source identifier along with a sequence number and a time of broadcast for at least one of the first stream of beacons;
  subsequent to detecting the first stream, detecting a second stream of beacons, the detected beacon stream comprising at least a second unique source identifier along with a packet sequence number and a broadcast time for each beacon;
  comparing the first and second unique source identifiers, packet sequence numbers and broadcast times of the at least one of the first stream of beacons; and
  responsive to a match between the first and second unique source identifiers and packet sequence numbers, and a mismatch of at least one of the times, determining that the first broadcast beacon stream has been spoofed by the second beacon stream.

6. The computer readable medium of claim 5, wherein in the method, the first and second stream of beacons both comprise IBEACONS.

7. The computer readable medium of claim 5, wherein in the method, the wireless communication channel comprises a BLUETOOTH communication channel.

8. The computer readable medium of claim 5, wherein in the method, the wireless communication channel comprises an IEEE 802.11 communication channel.

9. A wireless networking device for detecting spoof attacks of location broadcasting beacons, the wireless networking device comprising:
  a processor;
  a wireless network interface;
  a memory;
  a beacon stream database to detect a first stream of beacons comprising at least a first unique source identifier, and a packet sequence number with a broadcast time for each beacon, over a wireless communication channel; and
  the beacon stream database to store the unique source identifier along with a sequence number and a time of broadcast for at least one of the first stream of beacons,
  the beacon stream data base to, subsequent to detecting the first stream, detect a second stream of beacons, the detected beacon stream comprising at least a second unique source identifier along with a packet sequence number and a broadcast time for each beacon;
  the beacon comparison engine to compare the first and second unique source identifiers, packet sequence numbers and broadcast times of the at least one of the first stream of beacons, and
  the beacon comparison engine to, responsive to a match between the first and second unique source identifiers and packet sequence numbers, and a mismatch of at least one of the times, determine that the first broadcast beacon stream has been spoofed by the second beacon stream.

10. The wireless networking device of claim 9, wherein the wireless networking device comprises an access point.

11. The wireless networking device of claim 9, wherein the wireless networking device comprises a wireless device.

12. The wireless networking device of claim 9, wherein the wireless networking device comprises a wireless device.

* * * * *